F. G. S. HAM.
AUTOMATIC OR POWER DRIVEN DISTRIBUTER FOR FILTER BEDS AND THE LIKE.
APPLICATION FILED OCT. 7, 1910.
997,058.
Patented July 4, 1911.
5 SHEETS—SHEET 4.
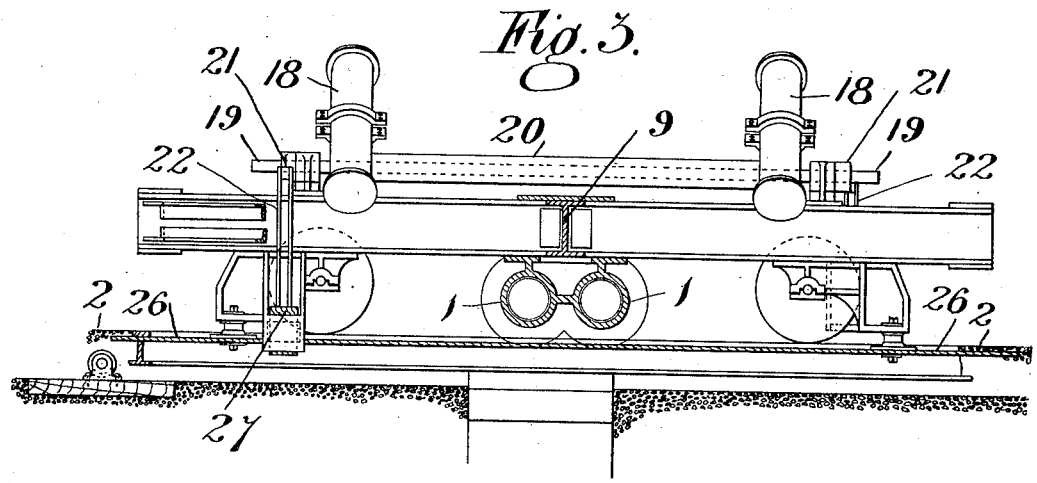
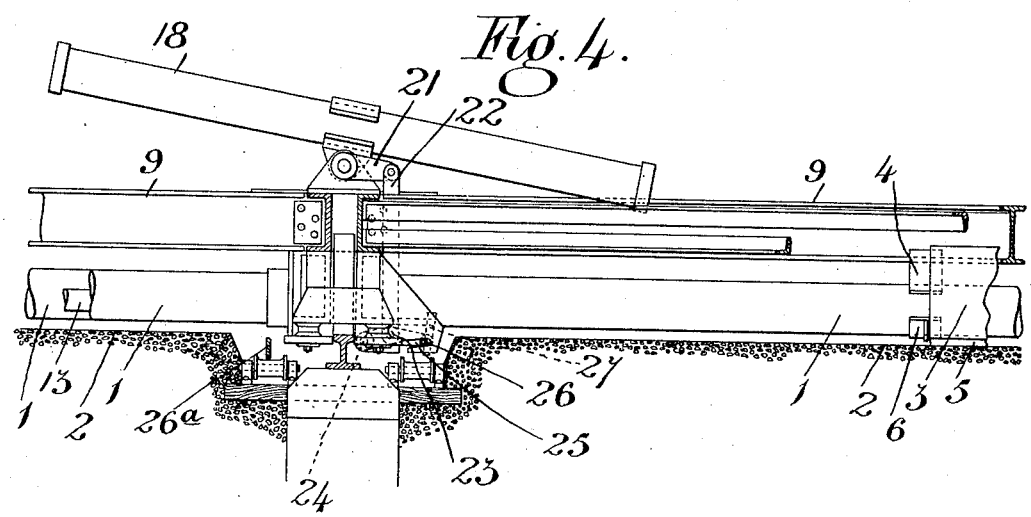

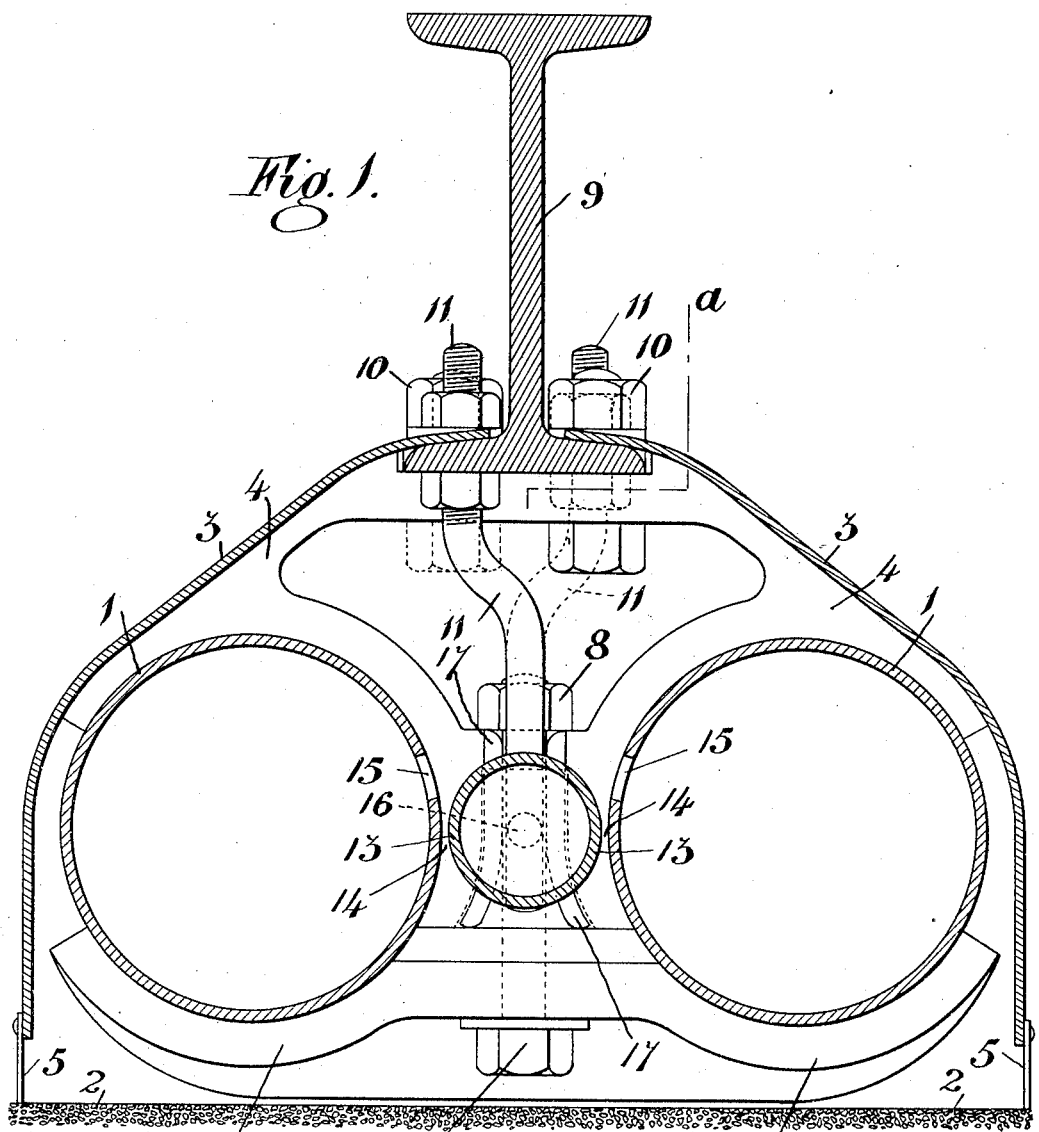

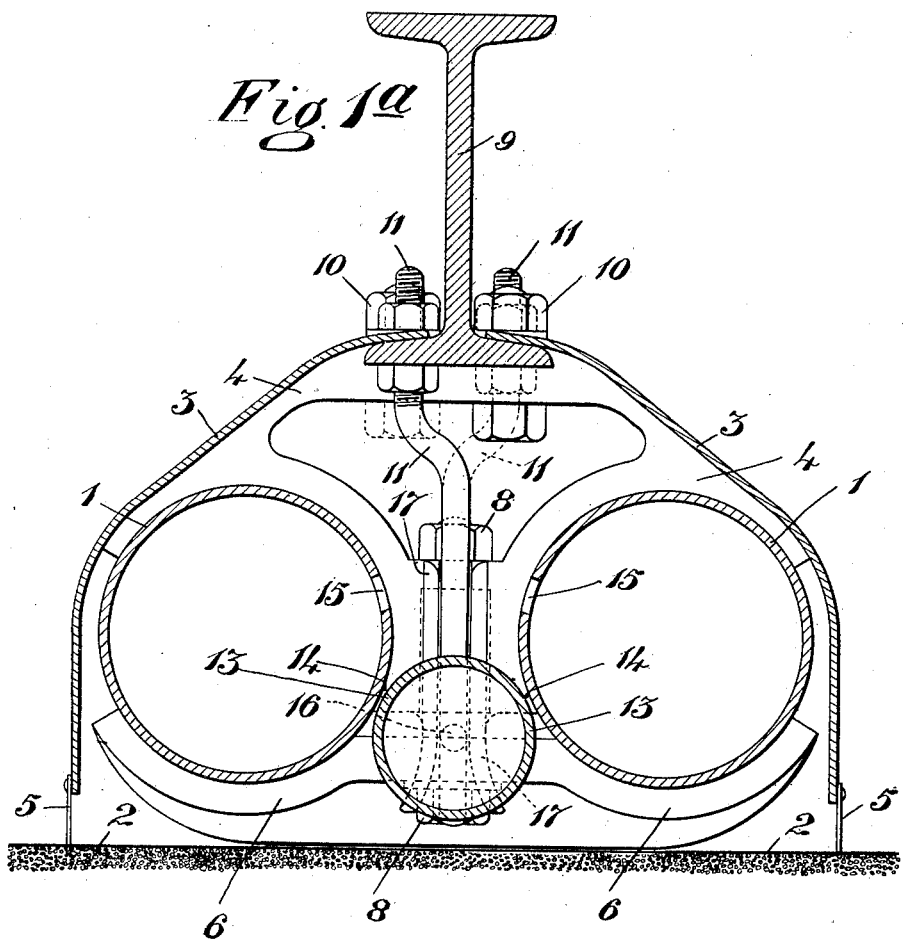

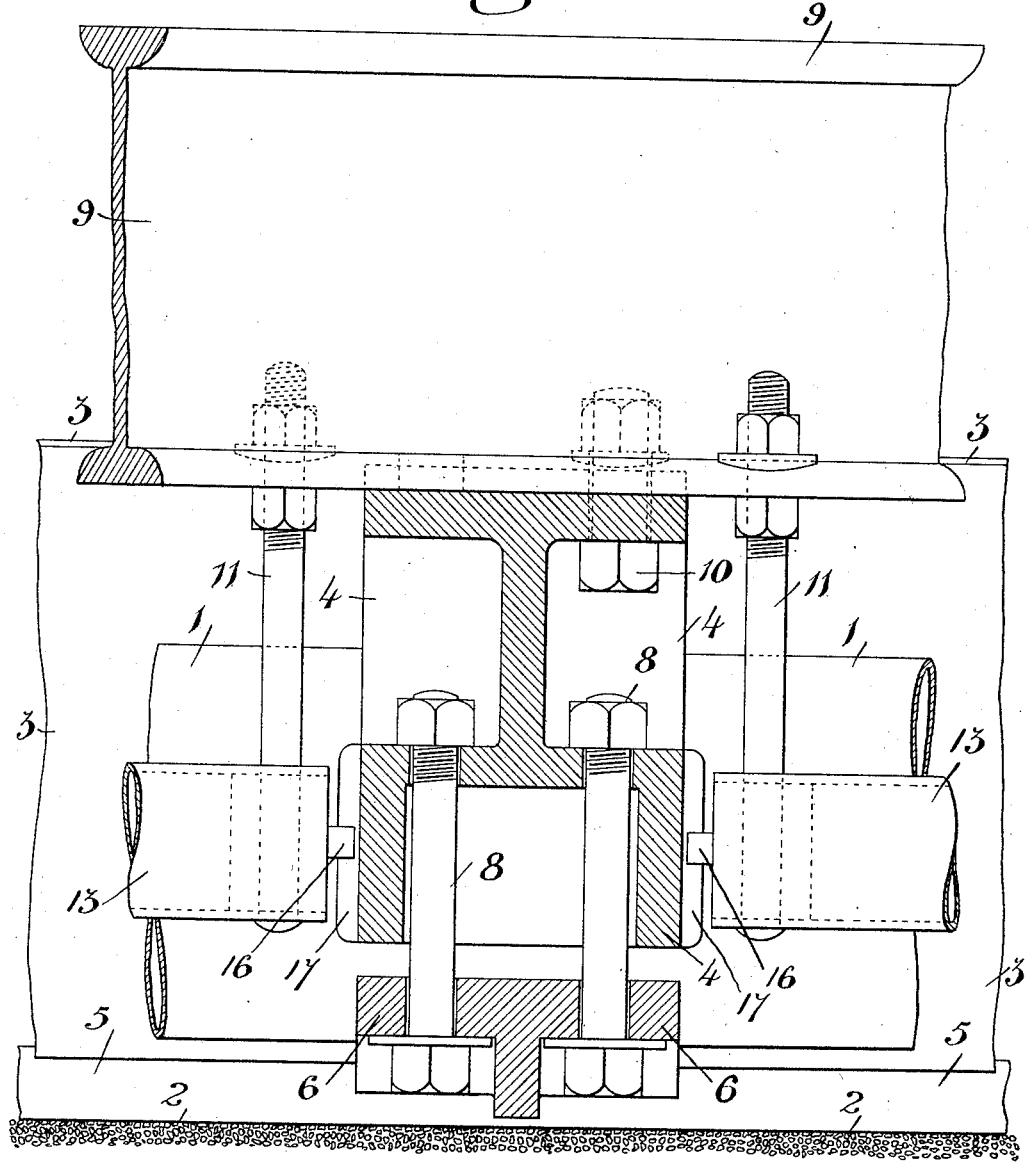

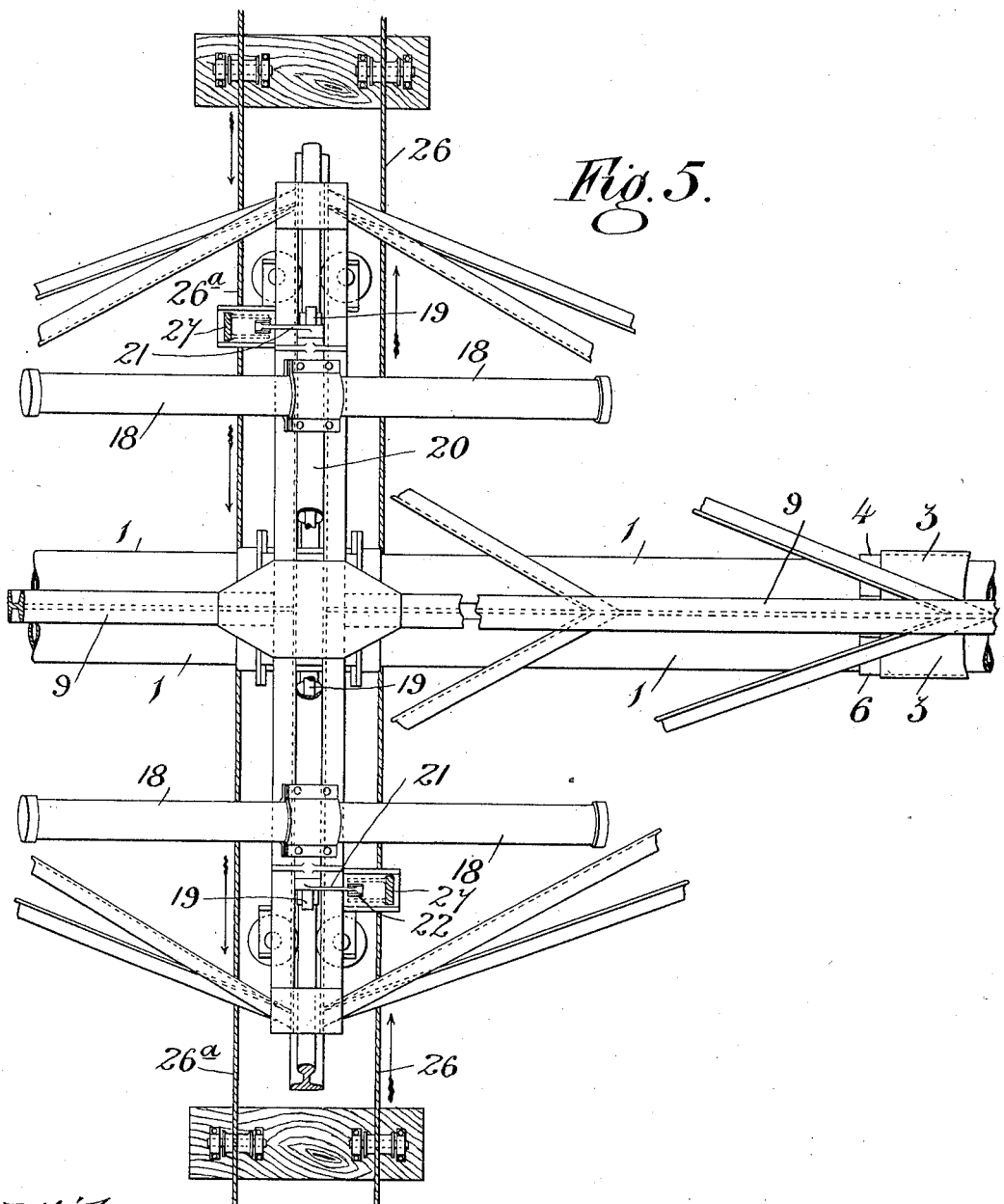

UNITED STATES PATENT OFFICE.

FREDERIC GEORGE SISON HAM, OF LONDON, ENGLAND.

AUTOMATIC OR POWER-DRIVEN DISTRIBUTER FOR FILTER-BEDS AND THE LIKE.

997,058. Specification of Letters Patent. Patented July 4, 1911.

Application filed October 7, 1910. Serial No. 585,823.

*To all whom it may concern:*

Be it known that I, FREDERIC GEORGE SISON HAM, a subject of the King of Great Britain, residing at London, England, have invented certain new and useful Improvements in or Relating to Automatic or Power-Driven Distributers for Filter-Beds and the Like, of which the following is a specification.

This invention relates to an apparatus for distribution of sewage or liquids upon filter beds and the like, and comprises the hereinafter described improvements whereby:—
(1) The dispersal of aerial nuisances and the dissemination of disease germs are inhibited. (2) The heat of the sewage is conserved and the effects of low temperatures minimized. (3) This distribution is rendered more uniform and at the same time capable of a wider range of variation than in the usual form of distributing apparatus. (4) The reversal of the distributer is obtained without the reversal of the driving mechanism.

My improvements in distributers for filter beds and the like are illustrated in the annexed drawings in which:—

Figure 1 is a cross section of the feed tubes carrying the liquid across the filter bed and showing the cover with its supporting means, also the baffle tube between the feed tubes. Fig. 1ª is a view similar to Fig. 1 showing a slight modification in the construction. Fig. 2 is a longitudinal section through *a a* of Fig. 1 showing a portion of the length of tubes, and showing more clearly the construction of bracket clip supporting the feed tubes. Fig. 3 is a side elevation of the center carriage carrying the transverse feed tubes before referred to. Fig. 4 is a front elevation, and Fig. 5 a plan of the central portion of the traveling distributer showing the reversing gear etc.

In the construction of a distributer in accordance with this invention the feed tube or tubes 1, 1, carrying the liquid across the filter bed 2 is or are incased by a covering 3 of sheet metal, wood, canvas, or other light material carried on a suitable frame work 4 and preferably so arranged as to leave a space between the tubes and the covering.

The cover I employ has preferably a flexible lower edge or edges 5, 5, either formed as part of the cover 3 itself, or attached thereto in such a way that it impinges upon or leaves the smallest practicable space between it and the surface of the filter.

The cover 3 if not itself of a non-conducting material may be provided with a lining of such material, and at the same time the air space between the cover and the tubes 1, 1, will constitute or may be utilized as a protection against low temperature of the outer atmosphere.

6 is a bracket clip for supporting the tubes 1, 1, from the frame 4 by means of the hangers or suspension bolts 8, 8. The frame 4 is supported from the central girder 9 by the bolts 10.

In the case of distributers for circular beds the feed supply may be conducted to the machine by a completely closed pipe properly protected from the weather and at the same time prevented from diffusing noxious gases and smell.

For the purpose of better regulation of the distribution I employ preferably two feed tubes 1, 1, before mentioned, between which I suspend, by means of screwed suspension bolts 11, 11, or other adjustable connectors from the central girder 9 a baffle or dividing plate or plates 13, 13, for preference of tubular section as shown in the drawings, and of such size as when passed between the aforesaid feed tubes 1, 1, will fill up nearly the whole of the space between them at the narrowest part, viz: in the position shown in the drawings, or I may make the baffle tube slightly larger in diameter or section than the space between the feed tubes at the narrowest parts, to facilitate control of the distribution and to enable any particular section to be entirely cut out of the action, as shown by Fig. 1ª, but when passed beyond, or in the case of the larger tube, not quite reaching this central or narrowest point, a horizontal gap or passage 14 is left on each side of the baffle 13 through which the sewage will be evenly distributed from the feed tubes 1, 1, by way of the orifices 15, 15, and conducted without splashing onto the surface of the filter by the lower segments of the baffle plate 13 and feed tubes 1, 1.

16, 16, are guide pins on the ends of the movable baffle tubes 13, which work between guide cheeks 17, 17, on the frame. By raising or lowering the baffle plate or tube 13 as a whole, by means of the screw suspension bolts 11, 11, the amount of fluid which may pass on to the bed is lessened or increased, and by raising or lowering individual sections I may vary the amount of liquid which may pass on to the portion of the bed directly underneath any particular section, or fed by that section or sections as compared with the others. Similarly I may by control of these sections neutralize or equalize any difference of flow which would otherwise take place due to irregularities of construction or to the position of the section with regard to the inlet. At the same time I so construct the baffle 13 and place the feed tubes 1, 1, that the liquid is carried as near as is practicable to the bed surface and may leave the baffle 13 and the adjoining feed tubes 1, 1, in such a way that splashing is, as far as possible, prevented. I may however, modify the details of the means of distributing above described.

My invention further consists in mechanism for providing for the reversal of the distributers at the end of the travel in either direction, though I may if desired utilize known methods of reversal to operate my special distributer.

The drawings show the distributer moved along the filter bed by means of a rope moving around a drum driven by power.

My invention provides for the reversing gear to be on the distributer itself, and in such manner that the driving mechanism always rotates in the same direction, the rope moving along each bed in one direction and back again in the other thus forming a continuous drive. I obtain this object by clipping the rope alternately as it travels in one direction or the other.

Referring to Figs. 3, 4 and 5, the clip for coupling the rope to the machine in one direction of travel automatically releases itself from the rope at the end of the required travel while the alternate clip automatically couples up to the return rope so that the machine may travel in the opposite direction. This is effected by means of two tubes 18, 18, mounted on a horizontal shaft 19, one on either side of the central girder 9, and connected to each other by a tube 20, the two tubes 18, 18, being so arranged that they may be rocked freely on the shaft 19 in either direction, till their center of gravity is far enough at one side or the other of the horizontal shaft 19. Their trunnions or mountings then engage with pegs or projections on the horizontal shaft and cause it to turn.

The horizontal shaft 19 is provided with levers 21, one at either end and on either side of the center of the shaft 19; these levers are securely fixed to the shaft 19 and are connected by means of suitable links 22 to toggle joints 23 which have their fulcrums at 24 and their free ends 25 prepared so that they may force the rope 26 or 26$^a$ as the case may be against backing pieces 27, and so grip it. The details of this reversing gear may however be modified.

The action is as follows:—When the machine nears the end of its travel in one direction the high side of one tube 18 comes into contact with a stop, and is gradually lowered as the machine travels till the tube 18 over-balances, taking with it the other rocking tube, and turning the horizontal shaft 19, thereby one lever 21 is raised while the other lever is depressed, thus removing the gripping piece 25 from the rope 26 or 26$^a$ and forcing the other gripping piece against the rope at the other side and reversing the travel of the machine. At the other end of the bed, or at any required point the action is reversed and the machine is again made to travel on its return journey.

What I do claim as my invention, and desire to secure by Letters Patent is:—

1. In a distributer for filter beds and the like, the combination with a filter bed, of feed tube means disposed over the bed, and a non-conducting covering for the feed tube means, a space being formed between the feed tube means and covering.

2. In a distributer for filter beds and the like, the combination with a filter bed, of feed tube means disposed over the bed, and adjustable baffle means for regulating the distribution of the liquid from the feed tube means relatively to the bed.

3. In a distributer for filter beds and the like, the combination with a filter bed, of feed tube means disposed over the bed, adjustable baffle means for regulating the distribution of the liquid from the feed tube means relatively to the bed, and a non-conducting covering for the feed tube and baffle means and spaced from the latter.

4. In a distributer for filter beds and the like, the combination with a filter bed, of feed tubes disposed over the bed, and tubular baffle means adjustably disposed between and out of contact with relation to the tubes for regulating the distribution of the liquid from the tubes relatively to the bed.

5. In a distributer for filter beds and the like, the combination with a filter bed, of feed tubes disposed over the bed, tubular baffle means adjustably disposed between and out of contact with relation to the tubes for regulating the distribution of the liquid from the tubes relatively to the bed, and a non-conducting cover for the tubes and baffle means and spaced from the latter.

6. In a distributer for filter beds and the like, the combination with a filter bed, of feed tube means disposed over the bed, and a non-conducting covering inclosing the feed tube means and having flexible lower edges.

7. In a distributer for filter beds and the like, the combination with a filter bed, of feed tubes disposed over the bed, and sectional baffle tubes adjustably interposed between and out of contact with the tubes to regulate the distribution of the liquid relatively to the filter bed.

In testimony whereof I have hereunto set my hand in presence of two subscribing witnesses.

FREDERIC GEORGE SISON HAM.

Witnesses:
　Wm. O. Brown,
　F. C. Smith.

Copies of this patent may be obtained for five cents each, by addressing the "Commissioner of Patents, Washington, D. C."